United States Patent
Barsness et al.

(10) Patent No.: US 8,185,901 B2
(45) Date of Patent: May 22, 2012

(54) PARSING AN APPLICATION TO FIND SERIAL AND PARALLEL DATA SEGMENTS TO MINIMIZE MIGRATION OVERHEAD BETWEEN SERIAL AND PARALLEL COMPUTE NODES

(75) Inventors: Eric L. Barsness, Pine Island, MN (US); David L. Darrington, Rochester, MN (US); Amanda Peters, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1063 days.

(21) Appl. No.: 12/109,267

(22) Filed: Apr. 24, 2008

(65) Prior Publication Data

US 2009/0271596 A1  Oct. 29, 2009

(51) Int. Cl.
*G06F 9/46* (2006.01)
(52) U.S. Cl. ...................................................... 718/102
(58) Field of Classification Search .................. None
See application file for complete search history.

(56) References Cited

U.S. PATENT DOCUMENTS

| 5,978,830 A * | 11/1999 | Nakaya et al. ................ 718/102 |
| 2008/0288746 A1* | 11/2008 | Inglett et al. ..................... 712/20 |
| 2009/0067334 A1* | 3/2009 | Archer et al. ................. 370/238 |
| 2009/0240930 A1* | 9/2009 | Barsness et al. .............. 712/229 |

OTHER PUBLICATIONS

Gibbons, Richard. "A Historical Application Profiler for Use by Parallel Schedulers" IPPS '97 Proceedings of the Job Scheduling Strategies for Parallel Processing, pp. 58-77.*

* cited by examiner

*Primary Examiner* — Jacob A Petranek
(74) *Attorney, Agent, or Firm* — Biggers & Ohanian LLP

(57) ABSTRACT

Methods, systems, and products are disclosed for executing an application on a parallel computer having a plurality of nodes. Executing an application on a parallel computer includes: booting up a first subset of a plurality of nodes in a serial processing mode; booting up a second subset of the plurality of nodes in a parallel processing mode; profiling, prior to application execution, an application to identify serial segments of the application, parallel segments of the application, and application data utilized by each of the serial segments and the parallel segments; and executing the application on the plurality of nodes, including migrating, in dependence upon the profile for the application upon encountering the parallel segments during execution, only specific portions of the application and the application data from the nodes booted up in the serial processing mode to the nodes booted up in the parallel processing mode.

18 Claims, 8 Drawing Sheets

PARSING AN APPLICATION TO FIND SERIAL AND PARALLEL DATA SEGMENTS TO MINIMIZE MIGRATION OVERHEAD BETWEEN SERIAL AND PARALLEL COMPUTE NODES

BACKGROUND OF THE INVENTION

1. Field of the Invention

The field of the invention is data processing, or, more specifically, methods, apparatus, and products for executing an application on a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network generally supports point-to-point communications. A tree network, however, typically only supports communications where data from one compute node migrates through tiers of the tree network to a root compute node or where data is multicast from the root to all of the other compute nodes in the tree network. In such a manner, the tree network lends itself to collective operations such as, for example, reduction operations or broadcast operations. In the current art, however, the tree network does not lend itself to and is typically inefficient for point-to-point operations. Although in general the torus network and the tree network are each optimized for certain communications patterns, those communications patterns may be supported by either network.

Many parallel computers consist of compute nodes that each only supports a single thread. Such parallel computers are sufficient for processing a parallel application in which the application consists of instructions that are only executed serially on each compute node using a single thread. To further enhance performance, however, more robust parallel computers include compute nodes that each supports multiple threads using a multi-processor architecture. Using these more robust parallel computers, software engineers have developed parallel applications in which each application consists of segments of instructions that are only executed serially on each node using a single thread and other segments that may be executed in parallel on each node using multiple threads. That is, each compute node utilizes a single processor while executing the serial code segments and spawns threads to the other processors on that node while executing the parallel code segments. The drawback to executing multi-threaded parallel applications on these more robust parallel computers in such a manner is that computing resources are being underutilized when the compute nodes are executing the serial code segments. As mentioned above, when the compute nodes are executing the serial code segments, each compute node is processing only a single thread, and thereby only utilizing a single processor in its multi-processor architecture.

SUMMARY OF THE INVENTION

Methods, systems, and products are disclosed for executing an application on a parallel computer. The parallel computer includes a plurality of compute nodes connected together through a data communications network. Each compute node has a plurality of processors capable of operating independently for serial processing among the processors and capable of operating symmetrically for parallel processing among the processors. The application has parallel segments designated for parallel processing and serial segments designated for serial processing. Executing an application on a parallel computer includes: booting up a first subset of the plurality of compute nodes in a serial processing mode; booting up a second subset of the plurality of compute nodes in a parallel processing mode; profiling, prior to application execution, the application to identify the serial segments of the application, the parallel segments of the application, and application data utilized by each of the serial segments and the parallel segments; and executing the application on the plurality of compute nodes, including migrating, in dependence upon the profile for the application upon encountering the parallel segments during execution, only specific portions of the application and the application data from the nodes booted up in the serial processing mode to the nodes booted up in the parallel processing mode.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
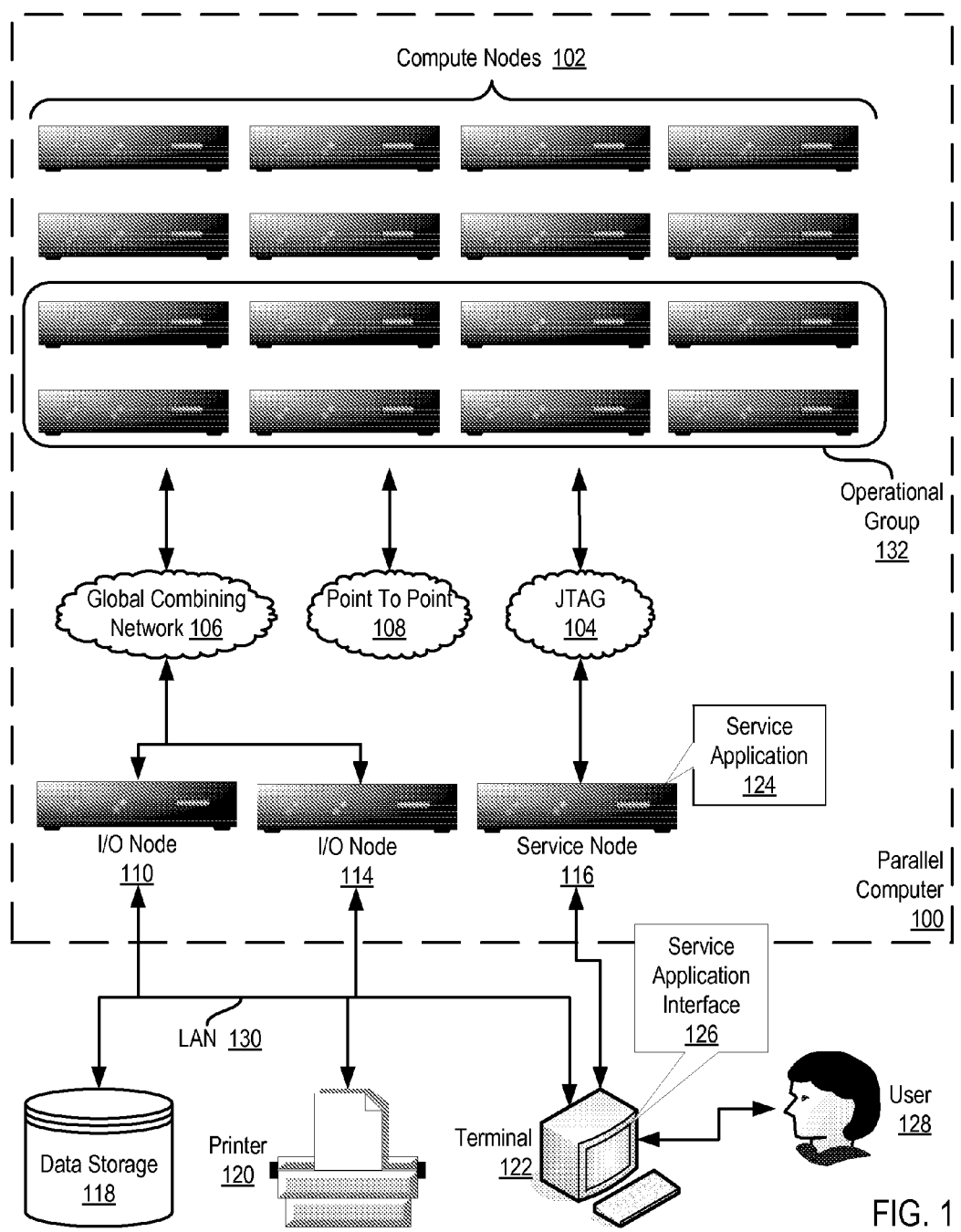
FIG. 1 illustrates an exemplary parallel computer for executing an application on a parallel computer according to embodiments of the present invention.

Exemplary methods, apparatus, and computer program products for executing an application on a parallel computer according to embodiments of the present invention are described with reference to the accompanying drawings, beginning with FIG. 1. FIG. 1 illustrates an exemplary parallel computer for executing an application on a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

Each compute node (102) includes a plurality of processors for use in executing an application on the parallel computer (100) according to embodiments of the present invention. The processors of each compute node (102) in FIG. 1 are operatively coupled to computer memory such as, for example, random access memory ('RAM'). Each compute node (102) may operate in several distinct modes that affect the relationship among the processors and the memory on that node such as, for example, serial processing mode and parallel processing mode. The mode in which the compute nodes operate is generally set during the node's boot process and does not change until the node reboots.

In a serial processing mode, often referred to a 'virtual node mode,' the processors of a compute node operate independently of one another, and each processor has access to a partition of the node's memory that is exclusively dedicated to that processor. For example, if a compute node has four processors and two Gigabytes (GB) of RAM, when operating in serial processing mode, each processor may processes a thread independently of the other processors on that node, and each processor may access a portion of that node's 2 GB of RAM.

In a parallel processing mode, often referred to as 'symmetric multiprocessing mode,' one of the processors acts as a master, and the remaining processors serve as slaves to the master processor. Each processor has access to the full range of computer memory on the compute node. Continuing with the exemplary node above having four processors and 2 GB of RAM, for example, each slave processor may cooperatively process threads spawned from the master processor, and all of the processors have access to the node's entire 2 GB of RAM.

In the parallel computer (100) of FIG. 1, the compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with network links among the compute nodes (102). The network links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is typically referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the various processes running on the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

MPI_MAX maximum
    MPI_MIN minimum
    MPI_SUM sum
    MPI_PROD product
    MPI_LAND logical and
    MPI_BAND bitwise and
    MPI_LOR logical or
    MPI_BOR bitwise or
    MPI_LXOR logical exclusive or
    MPI_BXOR bitwise exclusive or As mentioned above, most collective operation communications patterns build off of these basic collective operations. One such communications pattern is a gossiping communications pattern in which one set of compute nodes communicates with another set of compute nodes. The two sets of nodes participating in the gossip communications pattern could be the same or different. Examples of gossiping communications patterns implemented using MPI may include an all-to-all operation, an all-to-allv operation, an allgather operation, an allgatherv operation, and so on. In addition to compute nodes, the parallel computer (100) includes input/output ('I/O') nodes (110, 114) coupled to compute nodes (102) through the global combining network (106). The I/O nodes (110, 114) provide I/O services between compute nodes (102) and I/O devices (118, 120, 122). I/O nodes (110, 114) are connected for data communications I/O devices (118, 120, 122) through local area network ('LAN') (130) implemented using high-speed Ethernet. The parallel computer (100) also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the parallel computer (100) of FIG. 1 operates generally for executing an application on a parallel computer according to embodiments of the present invention. The application is computer software having parallel segments designated for parallel processing on each compute node and serial segments designated for serial processing on each compute node. The parallel computer (100) of FIG. 1 operates generally for executing an application on a parallel computer according to embodiments of the present invention by: booting up a first subset of the plurality of compute nodes (102) in a serial processing mode; booting up a second subset of the plurality of compute nodes (102) in a parallel processing mode; profiling, prior to application execution, the application to identify the serial segments of the application, the parallel segments of the application, and application data utilized by each of the serial segments and the parallel segments; and executing the application on the plurality of compute nodes (102), including migrating, in dependence upon the profile for the application upon encountering the parallel segments during execution, only specific portions of the application and the application data from the nodes booted up in the serial processing mode to the nodes booted up in the parallel processing mode.

Only migrating specific portions of the application and the application data advantageously reduces the overhead associated with migrating the application and its data from one compute node to another, thereby increasing overall system performance. To reduce migration overhead, the specific portions migrated may exclude the application data contained in data structures having a size that exceed some predetermined threshold. If such data is actually needed on the target node to which the application was migrated, the target node may access the data on the original node. Similarly, to reduce migration overhead, the specific portions migrated may exclude the application data contain in data structures designated as public data structures. Such public data structure would be available on all of the nodes in a particular operational group and therefore would not need to be migrated. In addition, to reduce migration overhead, the specific portions migrated may exclude one or more of the serial segments of the application or the application data that is utilized during execution of the serial segments of the application. Such serial segments and corresponding serial segment application data would not typically be utilized on the nodes booted up in parallel processing mode, and therefore those serial segments and correspond serial segment application data need not be migrated.

Readers will note that the term 'booting' as applied to compute nodes generally refers to the process of initializing compute node components to prepare the compute node for executing application layer software. Such booting may occur when power is first applied to each compute node, when power is cycled to each compute node, or when certain reset values are written to component registers. The process of booting a compute node may include loading system layer software such as an operating system to provide an interface through which application layer software may access the node's hardware. Such system layer software however may be quite lightweight by comparison with system layer software of general purpose computers. That is, such system layer software may be a pared down version as it were of system layer software developed for general purpose computers.

The arrangement of nodes, networks, and I/O devices making up the exemplary system illustrated in FIG. 1 are for explanation only, not for limitation of the present invention. Data processing systems capable of executing an application on a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Executing an application on a parallel computer according to embodiments of the present invention may be generally implemented on a parallel computer that includes a plurality of compute nodes. In fact, such computers may include thousands of such compute nodes. Each compute node is in turn itself a kind of computer composed of a plurality of computer processors (or processing cores), its own computer memory, and its own input/output adapters. For further explanation, therefore, FIG. 2 sets forth a block diagram of an exemplary compute node useful in a parallel computer capable of executing an application on a parallel computer according to embodiments of the present invention. The compute node (152) of FIG. 2 includes a plurality of processors (164) as well as random access memory ('RAM') (156). The processors (164) are connected to RAM (156) through a high-speed memory bus (154) and through a bus adapter (194) and an extension bus (168) to other components of the compute node (152).

Stored in RAM (156) is an application program (158), a module of computer program instructions that carries out parallel, user-level data processing using parallel algorithms. The application (158) of FIG. 2 has both parallel segments designated for parallel processing on each compute node and serial segments designated for serial processing on each compute node. The serial segments are portions of the application (158) that include computer program instructions for execution serially in a single thread on the compute node. The parallel segments are portions of the application (158) that include computer program instructions for execution in parallel on the compute node using multiple threads—typically one thread per processor (164).

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is a multi-processing module (161), a library of computer program instructions that carry out shared memory multi-processing among the plurality of processors (164) on the compute node (152). Application program (158) executes shared memory multi-processing operations using the functionality provided by the multi-processing module (161). The multi-processing module (161) may implement functionality specified in various shared memory multi-processing platforms such as, for example, the OpenMP™ shared memory multi-processing platform. Although illustrated in FIG. 2 as a separate component, readers will recognize that the multi-processing module (161) of FIG. 2 may be implemented as a component of an operating system.

Also stored in RAM (156) is an operating system (162), a module of computer program instructions and routines for an application program's access to other resources of the compute node. The operating system (162) may be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
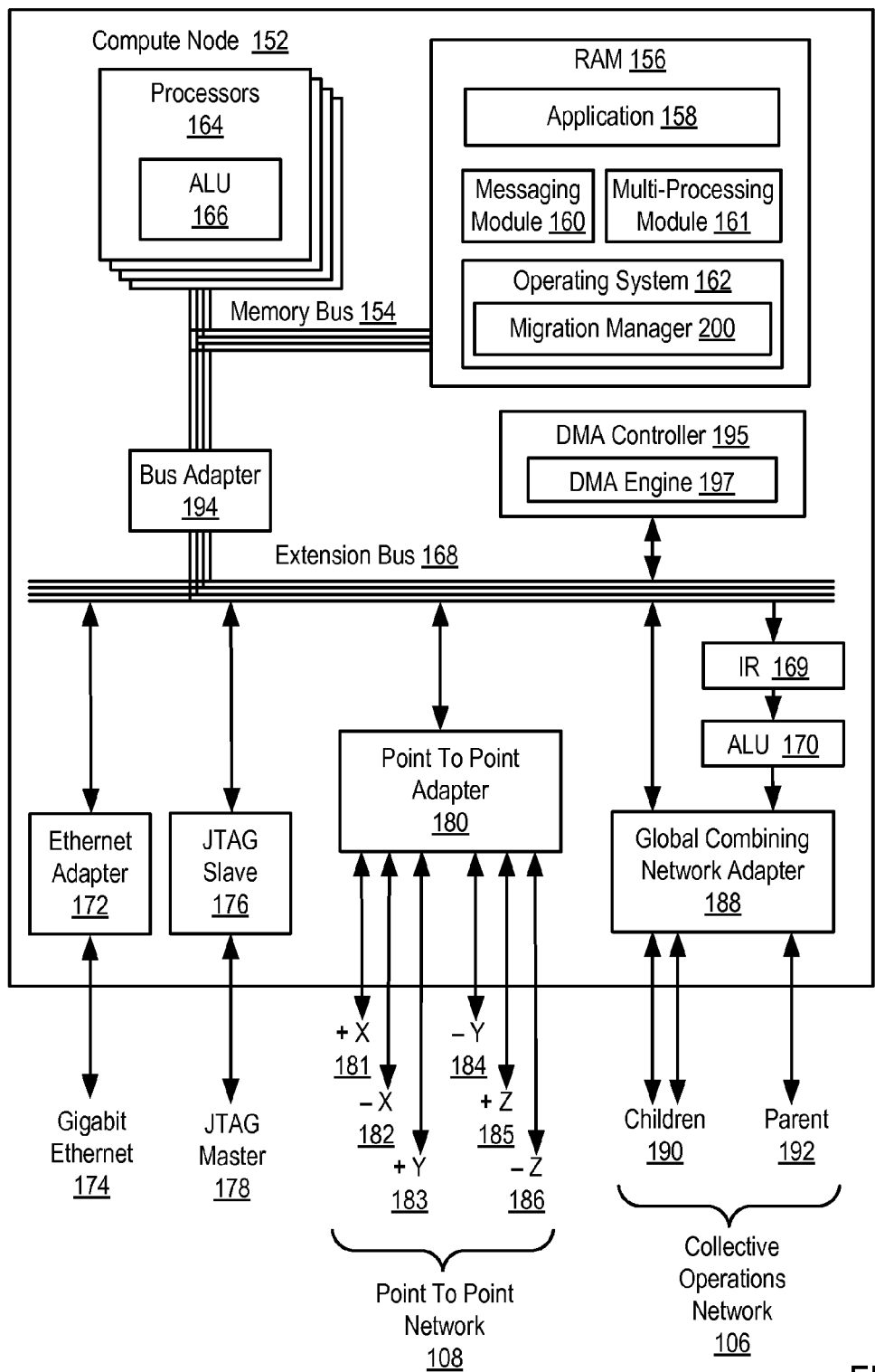
FIG. 2 sets forth a block diagram of an exemplary compute node useful in a parallel computer capable of executing an application on a parallel computer according to embodiments of the present invention.

Although the operating system (162) generally controls execution of the application (158) in the example of FIG. 2, the operating system (162) also includes a migration manager (200), which is a set of computer program instructions for migrating the application (158) from one compute node to another based on the segments of the application (158). The migration manager (200) may communicate with the migration manager on other compute nodes and with the service node to determine whether the application (158) should be migrated to another node, the node to which the migration manager (200) should migrate the application (158), the extent of the migration, and so on.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for executing an application on a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in executing an application on a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

The exemplary compute node (152) of FIG. 2 is included in a parallel computer that operates generally for executing the application (158) according to embodiments of the present invention. The parallel computer operates generally for executing the application (158) according to embodiments of the present invention by: booting up a first subset of the plurality of compute nodes in a serial processing mode; booting up a second subset of the plurality of compute nodes in a parallel processing mode; profiling, prior to application execution, the application to identify the serial segments of the application, the parallel segments of the application, and application data utilized by each of the serial segments and the parallel segments; and executing the application on the plurality of compute nodes, including migrating, in dependence upon the profile for the application upon encountering the parallel segments during execution, only specific portions of the application and the application data from the nodes booted up in the serial processing mode to the nodes booted up in the parallel processing mode. The mode in which the compute node boots up is generally determined by values set in registers for the processors (164), the bus adapter (194), and the RAM (168). A system administrator may set these values remotely through a JTAG network or in other ways as will occur to those of skill in the art.

Figure 3A:
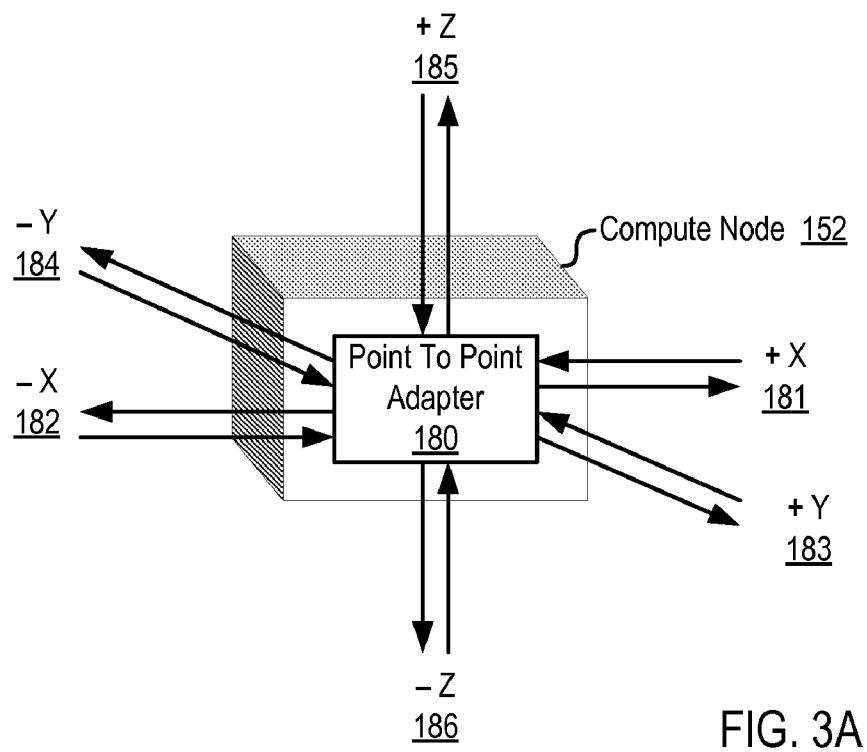
FIG. 3A illustrates an exemplary Point To Point Adapter useful in a parallel computer capable of executing an application on a parallel computer according to embodiments of the present invention.

For further explanation, FIG. 3A illustrates an exemplary Point To Point Adapter (180) useful in a parallel computer capable of executing an application on a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
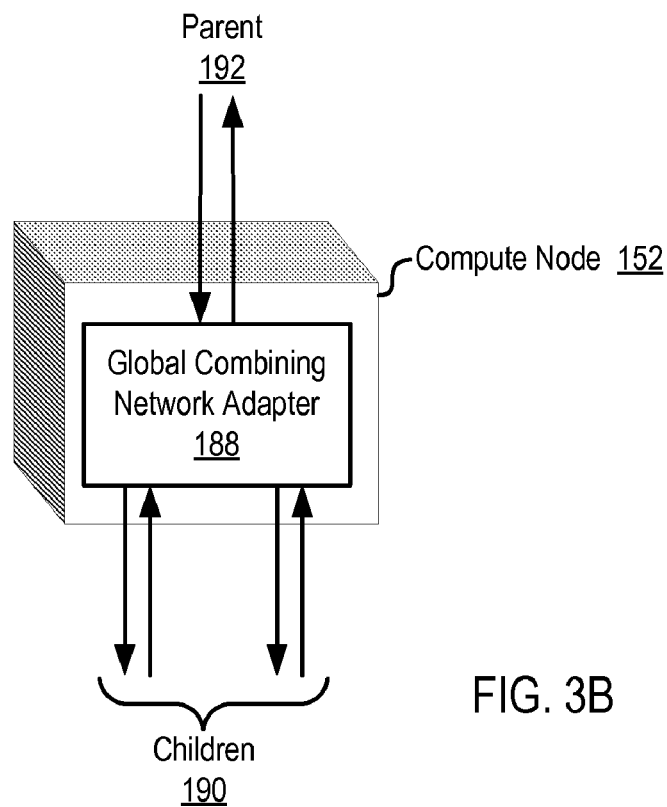
FIG. 3B illustrates an exemplary Global Combining Network Adapter useful in a parallel computer capable of executing an application on a parallel computer according to embodiments of the present invention.

For further explanation, FIG. 3B illustrates an exemplary Global Combining Network Adapter (188) useful in a parallel computer capable of broadcasting collective operation contributions throughout the parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes (190) through two links. Each link to each child node (190) is formed from two unidirectional data communications paths. Global Combining Network Adapter (188) also provides data communication to and from a parent node (192) through a link formed from two unidirectional data communications paths.

Figure 4:
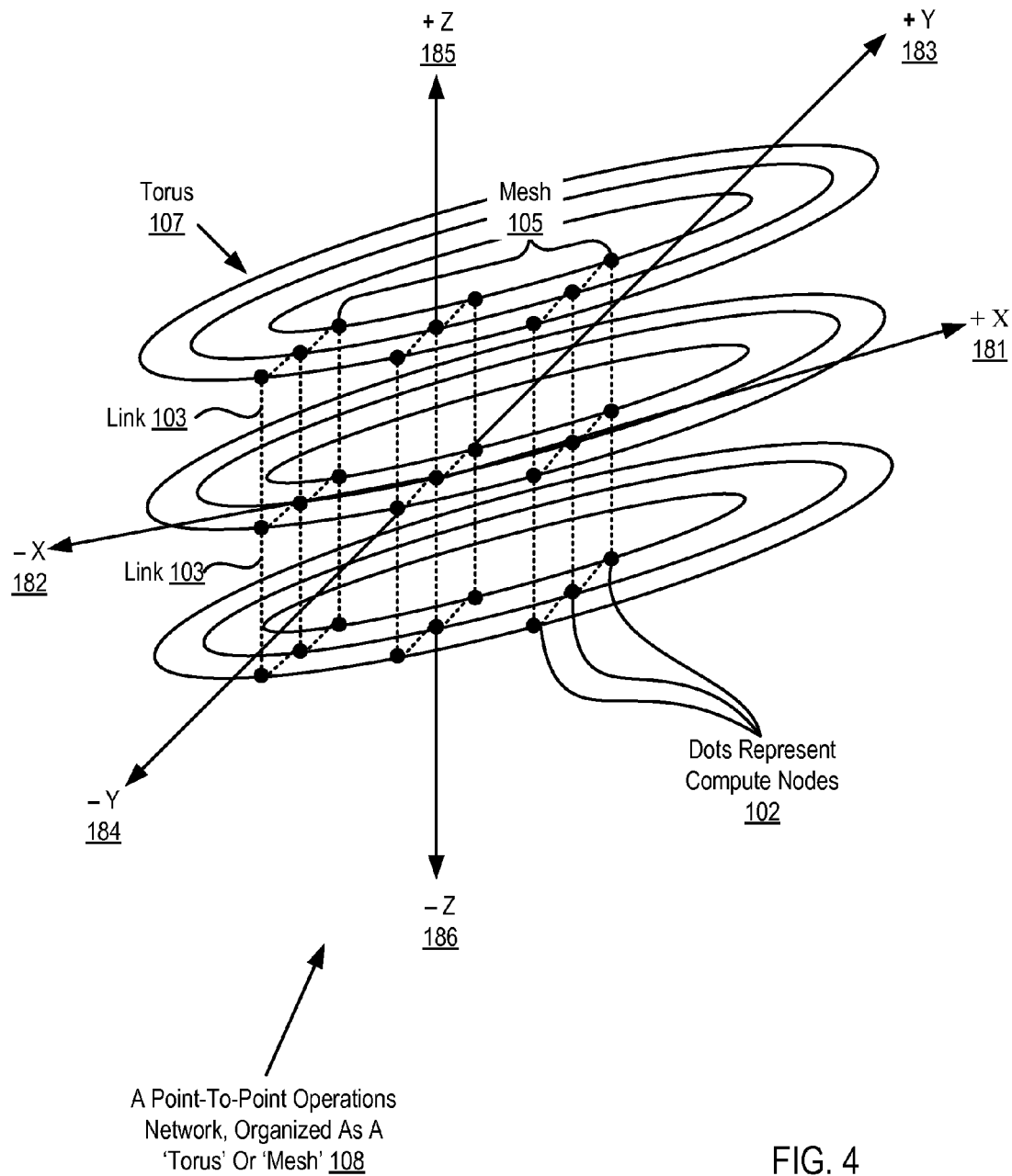
FIG. 4 sets forth a line drawing illustrating an exemplary data communications network optimized for point to point operations useful in a parallel computer capable of executing an application on a parallel computer according to embodiments of the present invention.

For further explanation, FIG. 4 sets forth a line drawing illustrating an exemplary data communications network (108) optimized for point to point operations useful in a parallel computer capable of executing an application on a parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in executing an application on a parallel computer in accordance with embodiments of the present invention may contain only a few compute nodes or may contain thousands of compute nodes.

Figure 5:
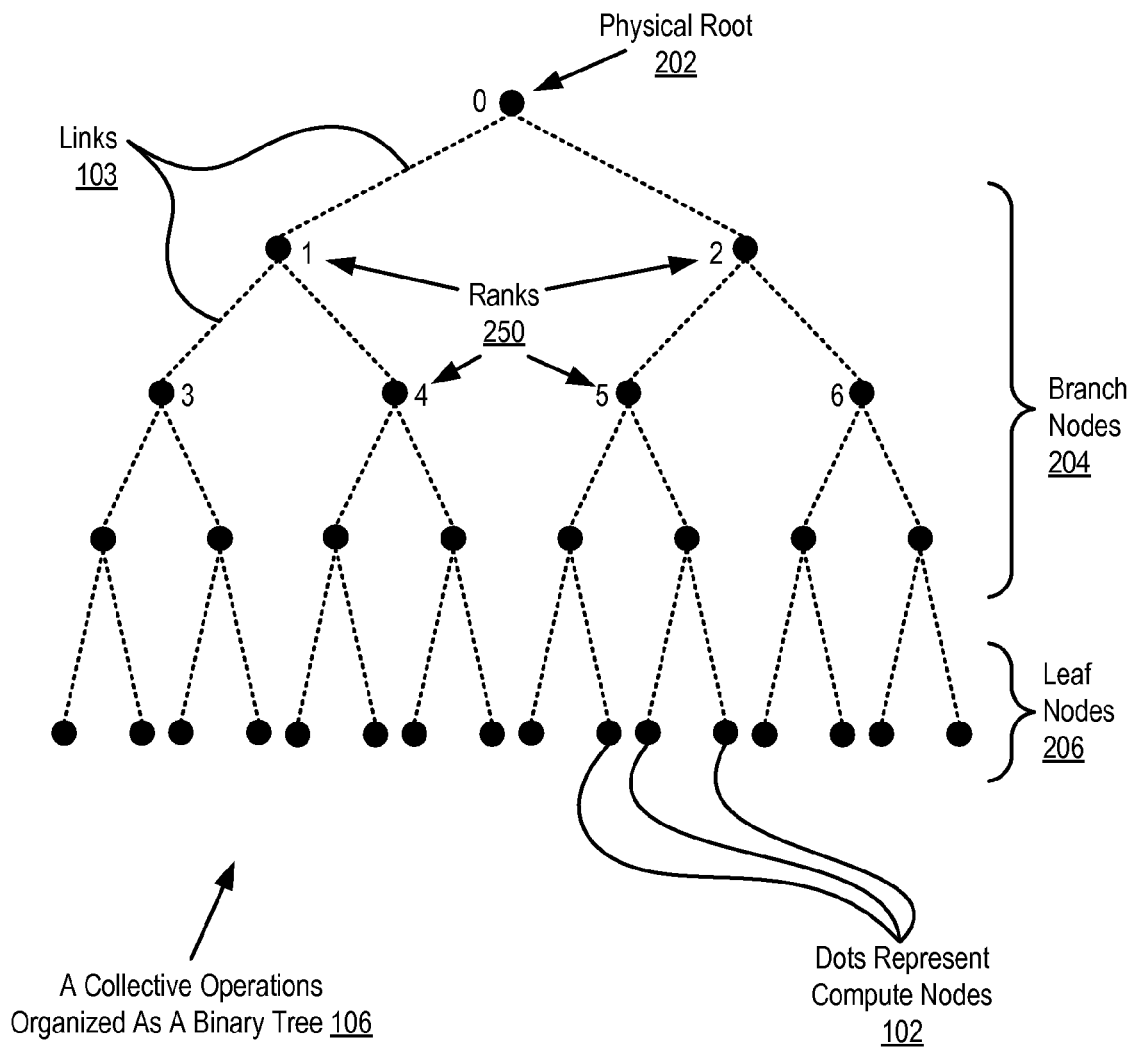
FIG. 5 sets forth a line drawing illustrating an exemplary data communications network optimized for collective operations useful in a parallel computer capable of executing an application on a parallel computer according to embodiments of the present invention.

For further explanation, FIG. 5 sets forth a line drawing illustrating an exemplary data communications network (106) optimized for collective operations useful in a parallel computer capable of executing an application on a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for executing an application on a parallel computer in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
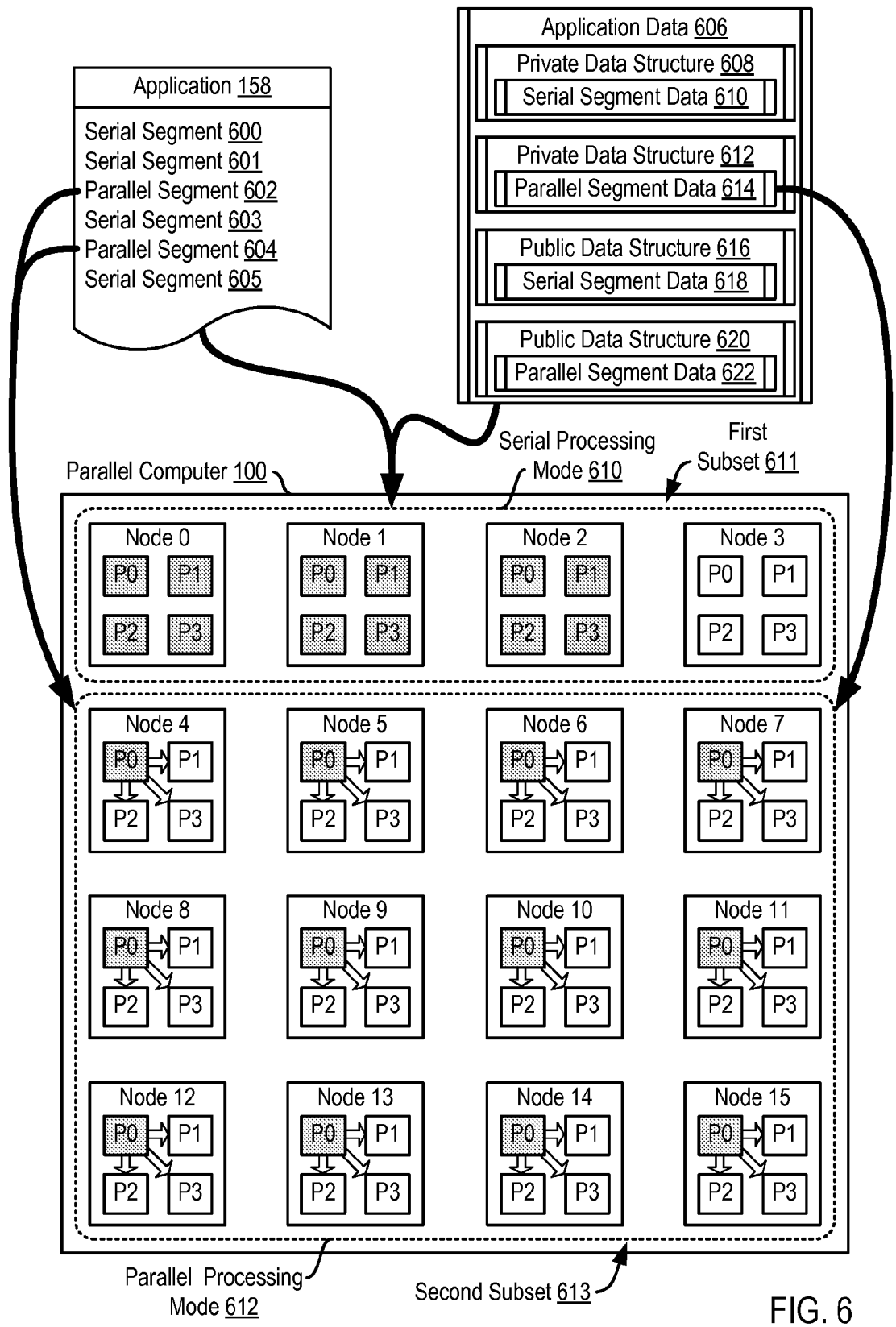
FIG. 6 sets forth a line drawing illustrating exemplary parallel computer capable of executing an application according to embodiments of the present invention.

For further explanation, FIG. 6 sets forth a line drawing illustrating exemplary parallel computer capable of executing an application according to embodiments of the present invention. The parallel computer (100) of FIG. 6 includes sixteen compute nodes labeled 0-15 and connected together through a data communications network. Each compute node 0-15 has four processors, or processing cores, labeled P0, P1, P2, and P3. The processors of each compute node 0-15 are capable of operating independently for serial processing among the processors P0-P3 and capable of operating symmetrically for parallel processing among the processors P0-P3. In the example of FIG. 6, a service node (not shown) boots up a first subset (611) of nodes that includes nodes 0-3 in a serial processing mode (610). The service node (not shown) also boots up a second subset (613) of nodes that includes nodes 4-15 in a parallel processing mode (612).

In the example of FIG. 6, the parallel computer (100) executes an application (158) on the computer's compute nodes. The application (158) of FIG. 6 has both a parallel segments (602, 604) designated for parallel processing and serial segments (600, 601, 603, 605) designated for serial processing. The serial segments (600, 601, 603, 605) include computer program instructions for execution serially in a single thread, while the parallel segments (602, 604) include computer program instructions for execution among multiple threads in parallel. The application (158) of FIG. 6 may distinguish the serial segments (600, 601, 603, 605) from the parallel segment (602, 604) in the application (158) using the programming directive '#pragma omp parallel { . . . }' for each parallel segment (602, 604) such that the computer program instructions of each parallel segment (602, 604) are placed in the curly braces of the directive. Readers will note that such an exemplary directive is for explanation only and not for limitation. In fact, the serial segments (600, 601, 603, 605) may be distinguished from the parallel segment (602, 604) in many other ways as will occur to those of skill in the art such as, for example, processor operation codes, historical execution information, and so on.

The application (158) of FIG. 6 generates or utilizes application data (606) during execution on the parallel computer (100). Application data (606) includes both serial segment data (610, 618) and parallel segment data (614, 622). Serial segment data is application data that is processed by the serial segments (600, 601, 603, 605) of the application (158). Parallel segment data is application data that is processed by the parallel segments (602, 604) of the application (158). Both serial segment data (610, 618) and parallel segment data (614, 622) are contained in public data structures (616, 620) and private data structures (608, 612). A public data structure is a data structure that is shared across a group of processes, typically running on a group of nodes such as for example an operational group. Alterations to data in a public data structure by any one process on any one node are reflected to all of the other processes on all of the other nodes that have access to that public data structure. In contrast, a private data structure is a data structure that is typically utilized by single process on a single node and is not generally shared with a group of processes on multiple nodes.

In the example of FIG. 6, the service node profiles the application (158) to identify the serial segments (600, 601, 603, 605) and the parallel segments (614, 622) of the application (158) prior to application deployment on the parallel computer (100). The service node may profile the application (158) by parsing application instructions of the application (158) for serial segments (600, 601, 603, 605) and parallel segments (614, 622). That is, the service node may examine the application (158) for directives such as '#pragma omp parallel' or special processor operation codes specifying that a particular segment of application instructions is designated for serial processing or parallel processing. In some other embodiments, the service node may profile the application (158) by identifying the serial segments (600, 601, 603, 605) and the parallel segments (614, 622) of the application (158) in dependence upon historical execution information. Regardless of the manner in which the application's serial segments (600, 601, 603, 605) and application's parallel segments (614, 622) are identified, the service node uses the application's profile to deploy the application (158) for execution on the parallel computer (100).

A service node may also profile the application (158) to identify the application data (606) utilized by each of the serial segments (600, 601, 603, 605) and the parallel segments (602, 604). The service node may profile the application (158) to identify the application data utilized by each of the serial segments and the parallel segments by parsing the serial segments (600, 601, 603, 605) and the parallel segments (602, 604) of the application (158) for operations that access application data (606)—that is, read operations, write operations, constructors, destructors, and so on. As part of identifying the application data utilized by the serial and parallel segments, the service node may identify the size of the application data utilized by these serial and parallel segments. To avoid having to migrate the application (158) and all of the application data (606) to the target nodes in parallel processing mode (612), large data structures that contain application data may only be migrated if those large data structures are utilized on the nodes in parallel processing mode during execution of the migrated portions of the application (158). Also as part of identifying the application data (606) utilized by the serial and parallel segments, the service node may identify whether application data utilized by the public and private data segments is contained in public data structures or private data structures. To avoid having to migrate the application (158) and all of the application data (606) to the target nodes in parallel processing mode (612), application data contained in public data structures may not be migrated because that data should already be available to the target node.

For discussion purposes with respect to FIG. 6, let us consider that an application developer or a system administrator has decided that twelve instances of the application (158) will be executed on the parallel computer (100). That is, twelve instances of the application (158) will be processed concurrently using twelve processors of the parallel computer (100). Accordingly, the serial segments (600, 601, 603, 605) of the application (158) will be executed using a minimum of twelve threads. That is, during serial segments, the parallel computer (100) will process twelve instances of the application (158), each instance utilizing a single thread of execution. Additional threads, however, may be utilized during parallel segments (602, 604) of the application (158) as each of those twelve initial threads spawn threads for enhanced performance during those parallel segments (602, 604). From the above description, readers will note that during serial segments (600, 601, 603, 605) of the application a certain level of parallel processing is being performed, but during the parallel segments (602, 604) of the application where additional threads are spawned, an even greater level of parallel processing may be utilized to enhance performance.

Because the application (158) begins with serial segment (600, 601), a service node (not shown) initially configures twelve instances of the application (158) on twelve processors across three compute nodes booted up in serial processing mode (610). Specifically, the service node configures the application (158) on each processor P0-P3 of compute nodes 0-2 as indicated by the shading of each of those processors. Because each instance of the application (158) only uses one thread during the serial segments (602, 606), the application (158) only uses twelve processing cores for execution, those twelve processing cores processing the twelve instances independently of one another. Readers will note that because all processors P0-P3 on each compute node 0-2 are utilized for processing the serial segment (602), the processing resources of each compute node 0-2 are not squandered.

Although the application instances generate application data (606) during execution, not all of the application data (606) may be generated by the application (158) during execution. Rather, some of the application data (606) may be data that is transformed or processed by the application (158) during execution that existed before the application was deployed. Accordingly, when the service node configures the application (158) on the processors of each node 0-2, the service node may also store the application data (606) in the portion of computer memory accessible by each processor on each node 0-2. In such a manner, each instance of the application (158) has access to the application data (606) when execution begins.

While all of the processors P0-P3 of each compute node 0-2 are being utilized for execution of the application (158), no additional processors are available on nodes 0-2 to process threads spawned when the parallel segments (602, 604) of the application (158) are encountered. Upon encountering the parallel segments (602, 604) during execution, therefore the parallel computer (100) migrates the application (158) to the compute nodes booted up in a parallel processing mode (612) according to embodiments of the present invention. Specifically in the example of FIG. 6, the following migration occurs: the application instance on P0 of node 0 is migrated to P0 of node 4; the application instance on P1 of node 0 is migrated to P0 of node 5; the application instance on P2 of node 0 is migrated to P0 of node 6; the application instance on P3 of node 0 is migrated to P0 of node 7; the application instance on P0 of node 1 is migrated to P0 of node 8; the application instance on P1 of node 1 is migrated to P0 of node 9; the application instance on P2 of node 1 is migrated to P0 of node 10; the application instance on P3 of node 1 is migrated to P0 of node 11; the application instance on P0 of node 2 is migrated to P0 of node 12; the application instance on P1 of node 2 is migrated to P0 of node 13; the application instance on P2 of node 2 is migrated to P0 of node 14; and the application instance on P3 of node 2 is migrated to P0 of node 15. In such a manner, the twelve instances of application (158) execute on P0 of nodes 4-15 as indicated by the shading of P0 in nodes 4-15. Because nodes 4-15 are booted in parallel processing mode (612), P0 serves as a master processor and the remaining processors P1-3 serve as slave processors to P0. During execution of the parallel segment (604) of FIG. 6, therefore, each application instance on P0 of nodes 4-15 may spawn threads to processors P1-3 of each node to aid in processing the parallel segment (604) as represented in FIG. 6 using arrows from P0 to P1-3 in nodes 4-15.

In migrating the application (158) from the nodes 0-2 in serial processing mode (610) to the nodes 4-15 in parallel processing mode (612), only specific portions of the application (158) and the application data (606) are migrated. The specific portions of the application (158) and the application data (606) are selected based on the application's profile generated prior to application execution. The specific portions of the application data (606) that are migrated may exclude the application data (606) contained in data structures having a size that exceed a predetermined threshold. The specific portions of the application data (606) that are migrated may exclude the application data (606) contain in data structures designated as public data structures (616, 620). The specific portions of the application data (606) that are migrated to the nodes booted up in the parallel processing mode may exclude the application data (606) that is utilized during execution of the serial segments (600, 601, 603, 605) of the application (158). The specific portions of the application (158) that are migrated to the nodes booted up in the parallel processing mode may exclude one or more of the serial segments (600, 601, 603, 605) of the application (158). Excluding certain portions of the application (158) or the application data (606) from migration reduces the information that must pass through the network and be reconstituted on the target nodes in parallel processing mode. In such a manner, the overhead required to migrate the application (158) to nodes in parallel processing mode (612) is minimized.

While all of the processors P0-3 of each compute node 4-15 are being utilized for execution of the application (158), none of the processors are underutilized because each processor executes either the main thread of an instance of the application (158) or a thread spawned from the main thread. Executing the serial segments (600, 601, 603, 605) of the application (158) on compute node 4-15, however, would result in three processors P1-3 not being utilized. Upon encountering the serial segments (600, 601, 603, 605) during execution of the application (158) in the example of FIG. 6, therefore, the parallel computer (100) migrates the previously migrated portions of application (158) back to the compute nodes booted up in the serial processing mode (610). Readers will recall that only specific portions of the application (158) and application data (606) were previously migrated to the nodes in parallel processing mode (612) to reduce migration overhead. In the same way, the return migration back to the nodes in serial processing mode (610) similarly benefits from the reduced migration overhead because the parallel computer need not migrate the entire application (158) or all of the application data (606).

Figure 7:
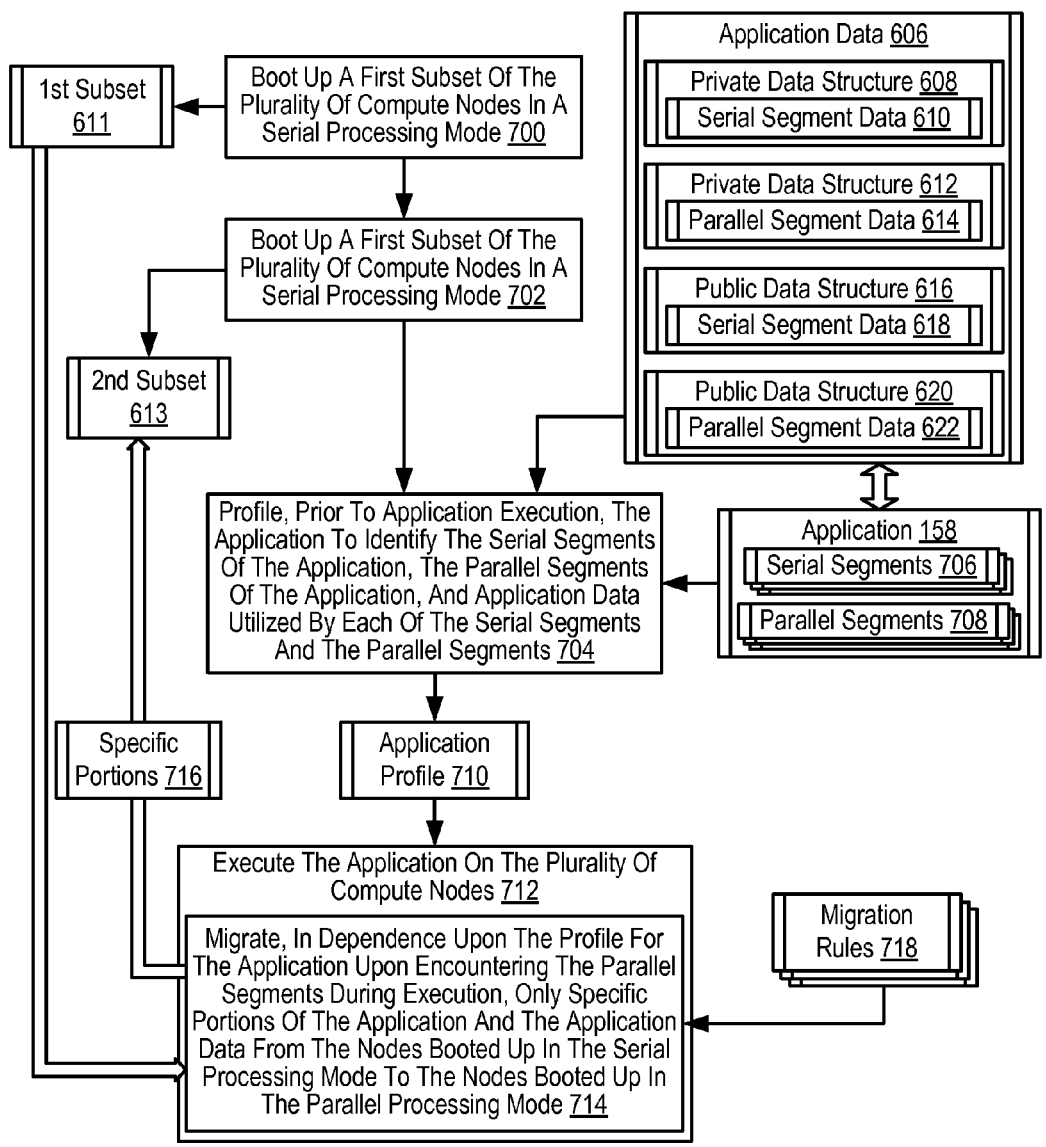
FIG. 7 sets forth a flow chart illustrating an exemplary method for executing an application on a parallel computer according to the present invention.

For further explanation, FIG. 7 sets forth a flow chart illustrating an exemplary method for executing an application on a parallel computer according to the present invention. The parallel computer described with reference to FIG. 7 includes a plurality of compute nodes connected together through a data communications network. Each compute node has a plurality of processors capable of operating independently for serial processing among the processors and capable of operating symmetrically for parallel processing among the processors. The application (158) of FIG. 7 has parallel segments (704) designated for parallel processing and serial segments (702) designated for serial processing.

The application (158) of FIG. 7 generates or utilizes application data (606) during execution on the parallel computer (100). Application data (606) includes both serial segment data (610, 618) and parallel segment data (614, 622). Serial segment data is application data that is processed by the serial segments (706) of the application (158). Parallel segment data is application data that is processed by the parallel segments (708) of the application (158). Both serial segment data (610, 618) and parallel segment data (614, 622) are contained in public data structures (616, 620) and private data structures (608, 612). A public data structure is a data structure that is shared across a group of processes, typically running on a group of nodes such as for example an operational group. Alterations to data in a public data structure by any one process on any one node are reflected to all of the other processes on all of the other nodes that have access to that public data structure. In contrast, a private data structure is a data structure that is typically utilized by single process on a single node and is not generally shared with a group of processes on multiple nodes. Readers will note that a data structure may be implemented in a variety of ways as will occur to those of skill in the art that range from simple structures such as, for example, single field variables, single or multiple field arrays to more complex structures such as, for example, objects or other aggregations composed of simpler structures.

The method of FIG. 7 includes booting up (700) a first subset (611) of the plurality of compute nodes in a serial processing mode. Booting up (700) a first subset (611) of the plurality of compute nodes in a serial processing mode according to the method of FIG. 7 may be carried out by setting register values in processors, memory, or bus circuitry of each compute node in the first subset (611) to instruct the node to operate in a serial processing mode. The minimum number of nodes included in the first subset (611) may be determined by dividing the number of instances of the application (158) that the application developer or system administrator desires to run concurrently on the parallel computer by the number of processors on each compute node. For example, if an application developer or a system administrator desires to have the parallel computer execute sixteen instances of the application (158) concurrently and each compute node has four processors, then the first subset (611) of nodes should include at least four compute nodes. In many embodiments, however, a service node may boot all of the compute nodes included in several racks in serial processing mode to provide a group of compute nodes for processing multiple applications concurrently.

The method of FIG. 7 also includes booting up (702) a second subset (613) of the plurality of compute nodes in a parallel processing mode. Booting up (702) a second subset (613) of the plurality of compute nodes in a parallel processing mode according to the method of FIG. 7 may be carried out by setting register values in processors, memory, or bus circuitry of each compute node in the second subset (613) to instruct the node to operate in a parallel processing mode. The minimum number of nodes included in the second subset (613) may be determined to be the number of instances of the application (158) that the application developer or system administrator desires to run concurrently on the parallel computer by the number of processors on each compute node. For example, if an application developer or a system administrator desire to have the parallel computer execute sixteen instances of the application (158) concurrently, then the second subset (613) of nodes may include at least sixteen compute nodes. In many embodiments, however, a service node may boot all of the compute nodes included in several racks in parallel processing mode to provide a group of compute nodes for processing multiple applications concurrently.

The method of FIG. 7 includes profiling (704), prior to application execution, the application (158) to identify the serial segments (706) of the application (158), the parallel segments (708) of the application (158), and the application data (606) utilized by each of the serial segments (706) and the parallel segments (708). Profiling (704) the application (158) prior to application execution according to the method of FIG. 7 may be carried out by a service node for the parallel computer or one or more compute nodes. The application profile (710) of FIG. 7 is a data structure that specifies the serial segments (706) and the parallel segments (708) in the application's execution sequence, the relationship between the application data (606) and those segments (706, 708), and attributes for the various portions of the application data (606). The application profile (710) may specify the serial segments (706) and the parallel segments (708) using processor instructions counter values that denote the beginning and the end of the serial segments (706) and the parallel segments (708). The application profile (710) may specify the relationship between the application data (606) and the segments (706, 708) using one or more tables that associate serial segment data (610, 618) with the serial segments (706) and the parallel segment data (614, 622) with parallel segments (708). The application profile (710) may specify attributes for the various portions of the application data (606) using one or more tables that indicate, for example, whether a particular portion of application data (606) is contained in a public data structure or a private data structure, the size of the portion of application data contained in a data structure, and so on. Readers will note, however, that such an implementation of an exemplary application profile (710) is for explanation only and not for limitation. Other implementations of an application profile as will occur to those of skill in the art may also be useful in configuring an application for execution on a parallel computer according to embodiments of the present invention.

Profiling (704) the application (158) prior to application execution to identify the applications' serial segments (706) and parallel segments (708) according to the method of FIG. 7 may be carried out by parsing application instructions of the application (158) for serial segments (706) and parallel segments (708). For example, a OpenMP™ directive '#pragma omp parallel{ . . . }' specifies that all of the instructions in the curly braces may be executed in parallel using multiple threads that shared the same memory. For another example, consider the UNIX instruction 'thr_create( )' that invokes a function to create a thread that execute concurrently with the thread calling the function.

Profiling (704) the application (158) prior to application execution to identify the application data (606) utilized by each of the serial segments (706) and the parallel segments (708) according to the method of FIG. 7 may be carried out by parsing the serial segments (706) and the parallel segments (708) of the application (158) for operations that access application data (606)—that is, read operations, write operations, constructors, destructors, and so on. As part of identifying the application data utilized by the serial and parallel segments, the service node may identify the size of the application data utilized by these serial and parallel segments. Also, the service node may identify whether application data utilized by the public and private data segments is contained in public data structures or private data structures.

In addition to parsing the application (158), profiling (704) the application (158) prior to application execution according to the method of FIG. 7 may also be carried out by identifying the serial segments (706) of the application (158), the parallel segments (708) of the application (158), and the application data (606) utilized by each of the serial segments (706) and the parallel segments (708) in dependence upon historical execution information. The historical execution information may be gathered by a service node that administers the application's execution on the parallel computer. Using historical execution information, the parallel computer may determined at what points during the application's execution that the application was previously migrated between nodes booted up in serial processing mode and nodes booted up in parallel processing mode and how the application data was accessed during the execution of those segments. The parallel computer may then use the identified information to infer the locations and sizes of the serial segments (706) and the parallel segments (708) of the application (158) along with information about the application data (606).

The method of FIG. 7 includes executing (712) the application (158) on the plurality of compute nodes, which includes migrating (714), in dependence upon the profile (710) for the application (158) upon encountering the parallel segments (708) during execution, only specific portions (716) of the application (158) and the application data (606) from the nodes booted up in the serial processing mode to the nodes booted up in the parallel processing mode—that is, from the nodes in the first subset (611) to the nodes in the second subset (613).

Migrating (714) only specific portions (716) of the application (158) and the application data (606) according to the method of FIG. 7 may be carried out by applying migration rules (718) to the application profile (710) to determine the specific portions (716) of the application (158) and the application data (606) to migrate, selecting nodes in the second subset (613) that are available for processing, and transferring the specific portion (716) to the selected nodes in the second subset (613). The migration rules (718) of FIG. 7 represent a set of criteria used to identify portions of the application (158) and the application data (606) to migrate. For example, the migration rules (718) may specify that the specific portions (716) of the application data (606) that are migrated exclude the application data (606) contained in data structures having a size that exceed a predetermined threshold. In such a manner, these large data structures remain on the nodes in the first subset (611)—the nodes in serial processing mode—and are only migrated if those large data structures are utilized on the nodes in parallel processing mode during execution of the migrated portions of the application (158), thereby avoiding the excessive migration of all of the application data (606) to the target nodes in parallel processing mode (612).

The migration rules (718) may also specify that the specific portions (716) of the application data (606) that are migrated exclude the application data contain in data structures designated as public data structures (616, 620) in the application profile (710). Because the target nodes in the second subset (613) already have access to the information in these public data structures (616, 620), there is no need to waste network and node resources by migrating these structures.

The migration rules (718) may also specify that the specific portions (716) of the application data (606) that are migrated to the nodes booted up in the parallel processing mode exclude the application data (606) that is utilized during execution of the serial segments (706) of the application and exclude one or more of the serial segments (706). Because execution of the application's serial segments (706), and thereby the use of serial segment data (610, 618), generally occurs only on the nodes in the first subset (611) booted in serial processing mode, there is no need to waste network and node resources by migrating the serial segments (706) and the serial segment data (610, 618). Readers will note that only migrating (714) the specific portions (716) of the application (158) and the application data (606) advantageously reduces the overhead associated with migrating the application and its data from compute nodes in the first subset (611) to compute nodes in the second subset (613), thereby increasing overall performance.

The explanation above with reference to FIG. 7 describes migrating specific portions of an application based on an application profile generated prior to the application's execution. In some other embodiments, the migration may also take place based on runtime performance information. For further explanation, consider FIG. 8 that sets forth a flow chart illustrating a further exemplary method for executing an application on a parallel computer according to the present invention. The parallel computer described with reference to FIG. 8 includes a plurality of compute nodes connected together through a data communications network. Each compute node has a plurality of processors capable of operating independently for serial processing among the processors and capable of operating symmetrically for parallel processing among the processors. The application (158) of FIG. 8 has parallel segments (704) designated for parallel processing and serial segments (702) designated for serial processing. The application (158) of FIG. 8 generates or utilizes application data (606) during execution on the parallel computer (100). Application data (606) includes both serial segment data (610, 618) and parallel segment data (614, 622), both of which are contained in public data structures (616, 620) and private data structures (608, 612).

Figure 8:
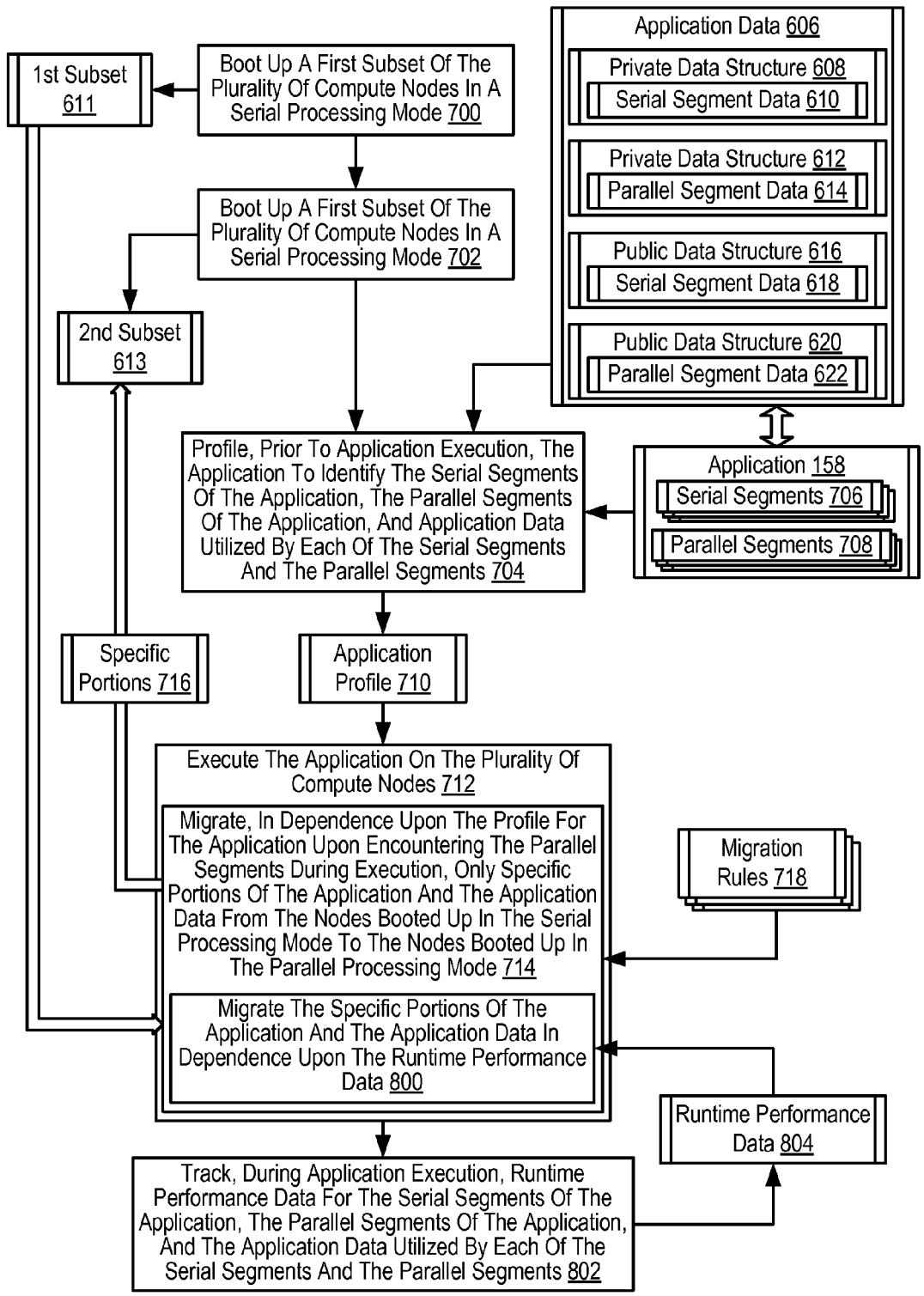
FIG. 8 sets forth a flow chart illustrating a further exemplary method for executing an application on a parallel computer according to the present invention.

The method of FIG. 8 is similar to the method of FIG. 7. That is, the method of FIG. 8 includes: booting up (700) a first subset (611) of the plurality of compute nodes in a serial processing mode; booting up (702) a second subset (613) of the plurality of compute nodes in a parallel processing mode; profiling (704), prior to application execution, the application (158) to identify the serial segments (706) of the application (158), the parallel segments (708) of the application (158), and the application data (606) utilized by each of the serial segments (706) and the parallel segments (708); and executing (712) the application (158) on the plurality of compute nodes, which includes migrating (714), in dependence upon the profile (710) for the application (158) upon encountering the parallel segments (708) during execution, only specific portions (716) of the application (158) and the application data (606) from the nodes booted up in the serial processing mode to the nodes booted up in the parallel processing mode—that is, from the nodes in the first subset (611) to the nodes in the second subset (613).

The method of FIG. 8 also includes tracking (802), during application execution, runtime performance data (804) for the serial segments (706) of the application (158), the parallel segments (708) of the application (158), and the application data (606) utilized by each of the serial segments (706) and the parallel segments (708). Tracking (802), during application execution, runtime performance data (804) according to the method of FIG. 8 may be carried out by a service node or one or more compute nodes that collect runtime performance data (804) from all of the nodes executing the application (158). The runtime performance data (804) of FIG. 8 represents information collected during execution of the application (158) that describes the relationships between the serial and parallel segments (706, 708) of the application (158) and the application data (606) utilized by those segments (706, 708). For example, runtime performance data may describe that each time a parallel segment (708) is migrated to a node in parallel processing mode for execution, a particular portion of application data (606) has to be retrieved from a node in serial processing mode because that portion of the application data (606) was not migrated along with the parallel segment (708).

In the example of FIG. 8, migrating (714), in dependence upon the profile (710) for the application (158) upon encountering the parallel segments (708) during execution, only specific portions (716) of the application (158) and the application data (606) from the nodes booted up in the serial processing mode to the nodes booted up in the parallel processing mode includes migrating (800) the specific portions (716) of the application (158) and the application data (606) in dependence upon the runtime performance data (804). Migrating (800) the specific portions (716) of the application (158) and the application data (606) in dependence upon the runtime performance data (804) according to the method of FIG. 8 may be carried out by applying migration rules (718) to the application profile (710) and the runtime performance data (804) to determine the specific portions (716) of the application (158) and the application data (606) to migrate, selecting nodes in the second subset (613) that are available for processing, and transferring the specific portion (716) to the selected nodes in the second subset (613). Continuing with the example from above in which runtime performance data describes that each time a parallel segment (708) is migrated to a node in parallel processing mode for execution, a particular portion of application data (606) has to be retrieved from a node in serial processing mode because that portion of the application data (606) was not migrated along with the parallel segment (708). That portion of the application data (606) may not have been migrated along with the parallel segment (708) because that portion of application data (606) may have exceeded a size threshold specified in the migration rules (718). Using the additional information provided by the exemplary runtime performance data, the migration rules (718) may specify that the portion of application data (606) should be included in the specific portions (716) of the application data (606) that are migrated regardless of whether that portion of the application data (606) exceeds a predetermined size threshold.

Exemplary embodiments of the present invention are described largely in the context of a fully functional parallel computer system for providing nearest neighbor point-to-point communications among compute nodes of an operational group in a global combining network. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of executing an application on a parallel computer, the parallel computer comprising a plurality of compute nodes connected together through a data communications network, each compute node having a plurality of processors capable of operating independently for serial processing among the processors and capable of operating symmetrically for parallel processing among the processors, the application having parallel segments designated for parallel processing and serial segments designated for serial processing, the method comprising:
    booting up a first subset of the plurality of compute nodes in a serial processing mode;
    booting up a second subset of the plurality of compute nodes in a parallel processing mode;
    profiling, prior to application execution, the application to identify the serial segments of the application, the parallel segments of the application, and application data utilized by each of the serial segments and the parallel segments; and
    executing the application on the plurality of compute nodes, including migrating, in dependence upon the profile for the application upon encountering the parallel segments during execution, only specific portions of the application and the application data from the nodes booted up in the serial processing mode to the nodes booted up in the parallel processing mode.

2. The method of claim 1 wherein:
    the method further comprises tracking, during application execution, runtime performance data for the serial segments of the application, the parallel segments of the application, and the application data utilized by each of the serial segments and the parallel segments; and
    migrating only specific portions of the application and the application data from the nodes booted up in the serial processing mode to the nodes booted up in the parallel processing mode further comprises migrating the specific portions of the application and the application data in dependence upon the runtime performance data.

3. The method of claim 1 wherein the specific portions of the application data that are migrated exclude the application data contained in data structures having a size that exceed a predetermined threshold.

4. The method of claim 1 wherein the specific portions of the application data that are migrated exclude the application data contain in data structures designated as public data structures.

5. The method of claim 1 wherein the specific portions of the application data that are migrated to the nodes booted up in the parallel processing mode exclude the application data that is utilized during execution of the serial segments of the application.

6. The method of claim 1 wherein the specific portions of the application that are migrated to the nodes booted up in the parallel processing mode exclude one or more serial segments of the application.

7. A parallel computer for executing an application, the parallel computer comprising a plurality of compute nodes connected together through a data communications network, each compute node having a plurality of processors capable of operating independently for serial processing among the processors and capable of operating symmetrically for parallel processing among the processors, the application having parallel segments designated for parallel processing and serial segments designated for serial processing, the parallel computer comprising computer memory operatively coupled to the processors of the plurality of compute nodes, the computer memory having disposed within it computer program instructions capable of:

booting up a first subset of the plurality of compute nodes in a serial processing mode;

booting up a second subset of the plurality of compute nodes in a parallel processing mode;

profiling, prior to application execution, the application to identify the serial segments of the application, the parallel segments of the application, and application data utilized by each of the serial segments and the parallel segments; and executing the application on the plurality of compute nodes, including migrating, in dependence upon the profile for the application upon encountering the parallel segments during execution, only specific portions of the application and the application data from the nodes booted up in the serial processing mode to the nodes booted up in the parallel processing mode.

8. The parallel computer of claim 7 wherein:

the computer memory has disposed within it computer program instructions capable of tracking, during application execution, runtime performance data for the serial segments of the application, the parallel segments of the application, and the application data utilized by each of the serial segments and the parallel segments; and migrating only specific portions of the application and the application data from the nodes booted up in the serial processing mode to the nodes booted up in the parallel processing mode further comprises migrating the specific portions of the application and the application data in dependence upon the runtime performance data.

9. The parallel computer of claim 7 wherein the specific portions of the application data that are migrated exclude the application data contained in data structures having a size that exceed a predetermined threshold.

10. The parallel computer of claim 7 wherein the specific portions of the application data that are migrated exclude the application data contain in data structures designated as public data structures.

11. The parallel computer of claim 7 wherein the specific portions of the application data that are migrated to the nodes booted up in the parallel processing mode exclude the application data that is utilized during execution of the serial segments of the application.

12. The parallel computer of claim 7 wherein the specific portions of the application that are migrated to the nodes booted up in the parallel processing mode exclude one or more serial segments of the application.

13. A computer program product for executing an application on a parallel computer, the parallel computer comprising a plurality of compute nodes connected together through a data communications network, each compute node having a plurality of processors capable of operating independently for serial processing among the processors and capable of operating symmetrically for parallel processing among the processors, the application having parallel segments designated for parallel processing and serial segments designated for serial processing, the computer program product disposed upon a recordable computer readable medium, the computer program product comprising computer program instructions capable of:

booting up a first subset of the plurality of compute nodes in a serial processing mode;

booting up a second subset of the plurality of compute nodes in a parallel processing mode;

profiling, prior to application execution, the application to identify the serial segments of the application, the parallel segments of the application, and application data utilized by each of the serial segments and the parallel segments; and executing the application on the plurality of compute nodes, including migrating, in dependence upon the profile for the application upon encountering the parallel segments during execution, only specific portions of the application and the application data from the nodes booted up in the serial processing mode to the nodes booted up in the parallel processing mode.

14. The computer program product of claim 13 wherein:

the computer program products further comprises computer program instructions capable of tracking, during application execution, runtime performance data for the serial segments of the application, the parallel segments of the application, and the application data utilized by each of the serial segments and the parallel segments; and migrating only specific portions of the application and the application data from the nodes booted up in the serial processing mode to the nodes booted up in the parallel processing mode further comprises migrating the specific portions of the application and the application data in dependence upon the runtime performance data.

15. The computer program product of claim 13 wherein the specific portions of the application data that are migrated exclude the application data contained in data structures having a size that exceed a predetermined threshold.

16. The computer program product of claim 13 wherein the specific portions of the application data that are migrated exclude the application data contain in data structures designated as public data structures.

17. The computer program product of claim 13 wherein the specific portions of the application data that are migrated to the nodes booted up in the parallel processing mode exclude the application data that is utilized during execution of the serial segments of the application.

18. The computer program product of claim 13 wherein the specific portions of the application that are migrated to the nodes booted up in the parallel processing mode exclude one or more serial segments of the application.

\* \* \* \* \*